Patented Dec. 15, 1931

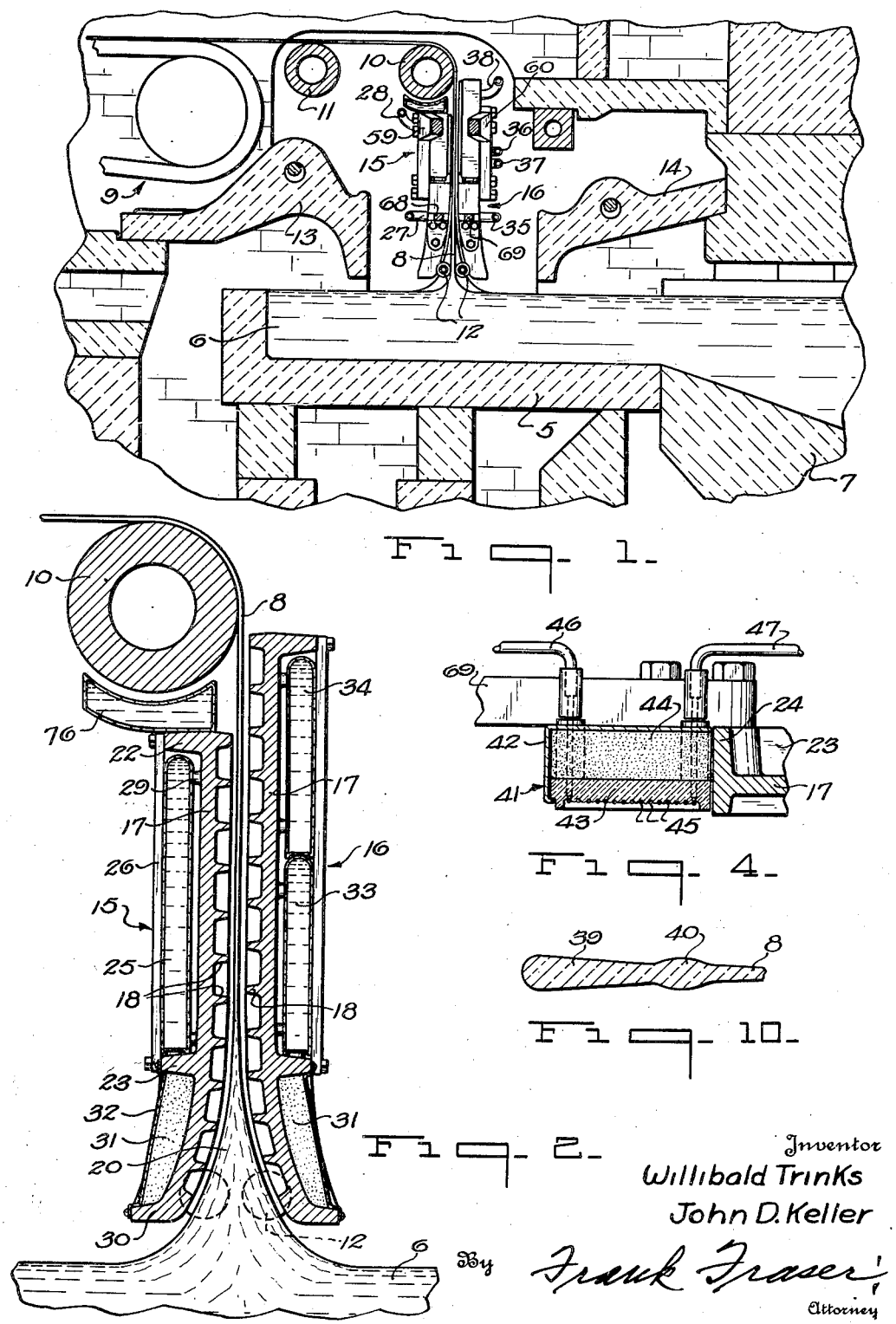

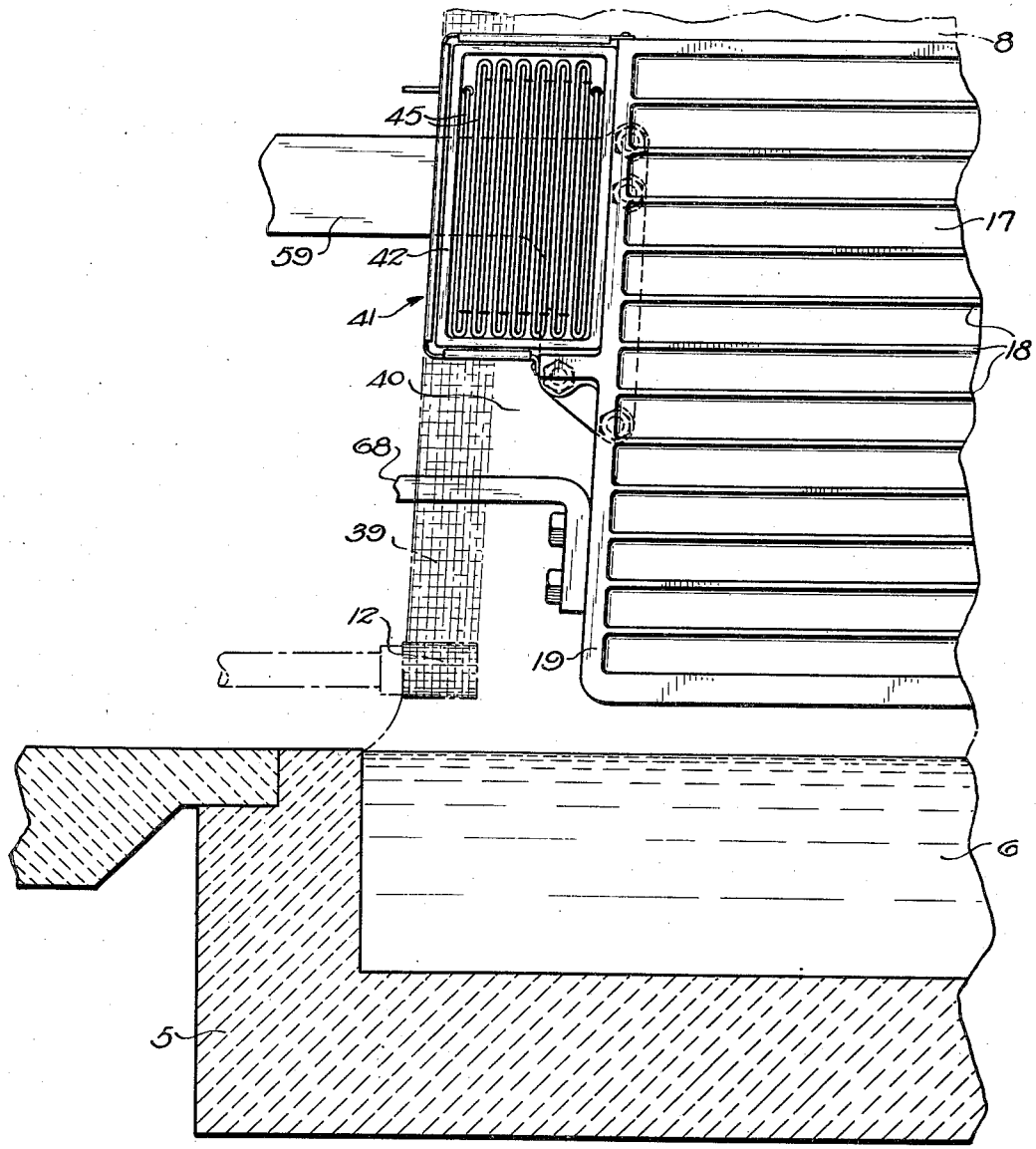

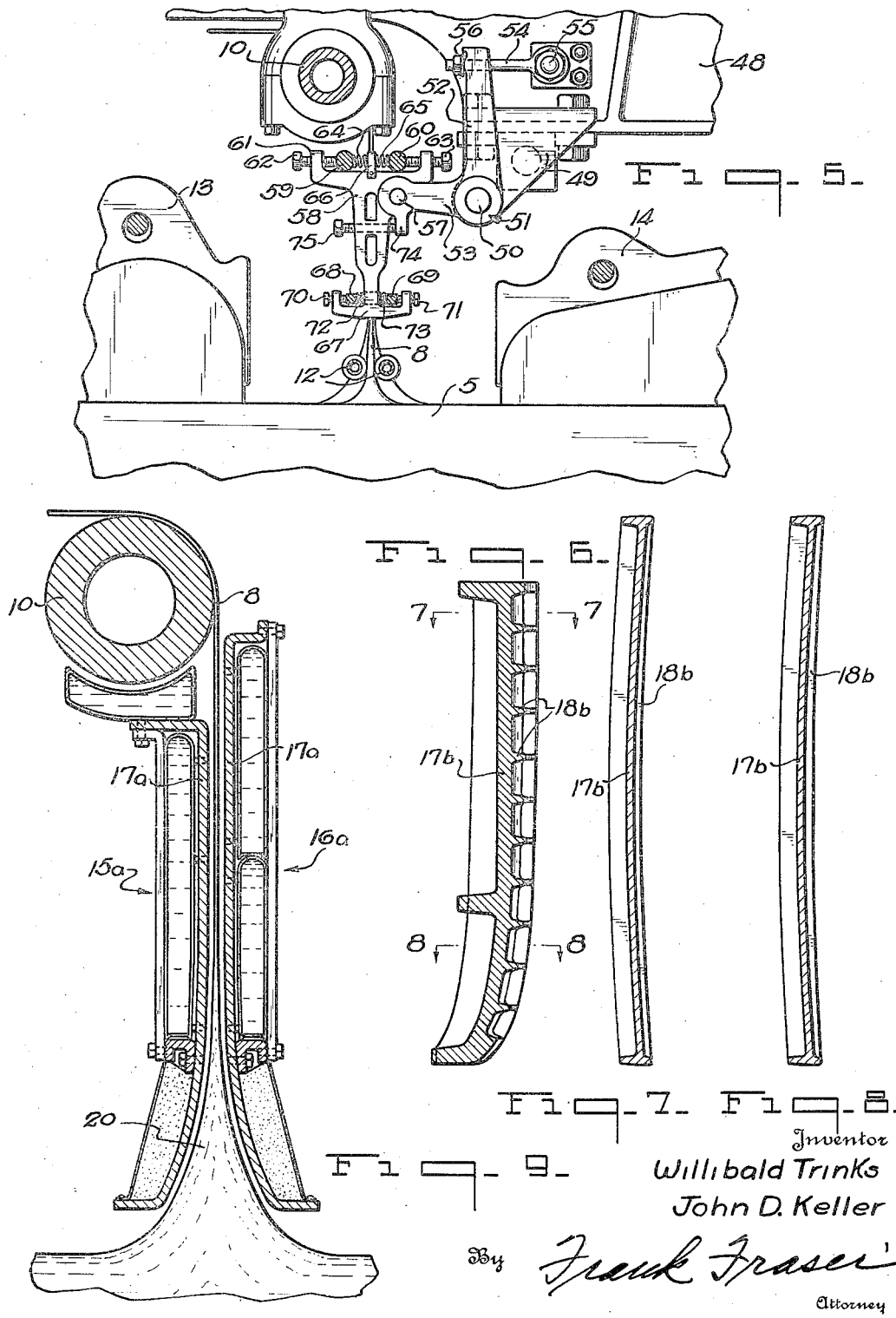

1,836,409

UNITED STATES PATENT OFFICE

WILLIBALD TRINKS AND JOHN D. KELLER, OF PITTSBURGH, PENNSYLVANIA, ASSIGNORS TO LIBBEY-OWENS-FORD GLASS COMPANY, OF TOLEDO, OHIO, A CORPORATION OF OHIO

SHEET GLASS APPARATUS

Application filed December 3, 1928. Serial No. 323,335.

The present invention relates generally to the drawing upwardly of glass in flat sheet form from a bath of molten glass and more especially to the provision of improved means for shielding the sheet during its vertical draw.

In the production of sheet glass in accordance with one of the processes now in general use, the sheet is drawn upwardly from a bath of molten glass for a suitable distance and then while still in a semi-plastic condition, although substantially set in its final sheet form, is deflected into the horizontal plane and passed horizontally through an annealing leer. In such process, there is sometimes a tendency toward the formation of longitudinal waves in the sheet as the said sheet is drawn upwardly from the bath of molten glass, said waves usually appearing as vertical streaks in the sheet. The formation of these waves is believed to result principally from the setting up of convection currents in the air and gases surrounding the sheet and partially from drafts and puffs of gases issuing from the furnace. The convection currents act to chill the glass sheet unevenly and thereby cause it to draw unevenly.

The principal object and aim of this invention is the provision of improved shielding means for protecting the sheet during its vertical draw, said means functioning to eliminate or break up the convection currents above described, whereby the formation of longitudinal waves in the sheet from this cause may be obviated. In addition, the shielding means serves to protect the sheet from drafts and puffs of gases from the furnace and further prevents dirt, dust and other foreign matter from coming in contact therewith. By eliminating the convention currents, the shielding means tends to render cooling and contraction of the sheet more uniform.

Another object of the invention is the utilization of means associated with the shields proper for preventing air currents from coming in contact with the backs thereof, to the end that convection air currents are not only prevented from direct contact with the glass surfaces during the drawing operation, but also wherein any possible indirect effect by uneven or streaky cooling of the rear surfaces of the shields is avoided.

A further object of the invention is the provision of electric heating means associated with the shields for heating and thus softening the thickened or knurled edge portions formed on the sheet during the drawing operation whereby to facilitate proper bending of said sheet from the vertical into the horizontal plane.

This invention also contemplates the provision of novel means for supporting and adjusting the shields.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one type of drawing apparatus showing the improved shielding means provided by the present invention incorporated therewith.

Fig. 2 is a vertical longitudinal section through a portion of the drawing apparatus and also of the shielding means.

Fig. 3 is a fragmentary transverse section through the drawing apparatus showing a front elevation of a portion of one of the shields.

Fig. 4 is a transverse section through one of the electric heaters.

Fig. 5 is a side elevation, partially in section, of the supporting and adjusting means for the shields.

Fig. 6 is a detail vertical sectional view of one of the shields proper.

Fig. 7 is a section taken substantially on the line 7—7 of Fig. 6.

Fig. 8 is a section taken substantially on the line 8—8 of Fig. 6.

Fig. 9 is a view similar to Fig. 2 but showing a slightly modified type of shield, and Fig. 10 is a detail section of one of the sheet edges.

While, in the accompanying drawings, there is illustrated one particular type of sheet glass drawing apparatus with which the improved shields, provided by the present invention, might be incorporated, it is to be understood that the use of said shields is not to be restricted to the particular drawing apparatus disclosed. The sheet glass drawing apparatus herein illustrated by way of example, however, includes a relatively shallow working receptacle or draw pot 5 containing a mass of molten glass 6, preferably supplied thereto from a suitable furnace 7 which may or may not be of the continuous tank type as desired. The glass sheet 8 is drawn upwardly from the surface of the molten bath 6 by means of suitable drawing mechanism illustrated diagrammatically and designated in its entirety by the numeral 9. The sheet is initially drawn upwardly for a suitable distance and then, while still in a semi-plastic condition although substantially set in its final sheet form, is deflected into the horizontal plane about a bending member or roll 10, passed over an idler roll 11 and through the drawing mechanism 9 into an annealing leer, not shown. For the purpose of maintaining the sheet to width, any suitable width maintaining means may be utilized such as for instance the knurled rollers 12 which are arranged to engage opposite sides of the sheet at both edges thereof. These rollers are adapted to be positively driven and are usually positioned closely adjacent the molten bath 6. Arranged at either side of the sheet and partially covering the molten bath are lip tiles 13 and 14, which serve to direct heated gases downwardly upon the surface of the molten glass 6 to assist in properly conditioning the same.

As brought out above, this invention, in its general aspect, contemplates the provision of improved means for shielding the glass sheet during its vertical draw. The shields herein provided are adapted to be mounted at opposite sides of the sheet 8 and are designated in their entirety 15 and 16 respectively. Each shield proper consists essentially of a metallic plate 17 provided upon its inner surface with a plurality of spaced horizontal baffles or ribs 18, these baffles or ribs extending transversely of the sheet 8 and being connected at their opposite ends by substantially vertical marginal ribs 19. The upper portions of the shields proper are straight and substantially parallel with the sheet, while the lower portions thereof are curved outwardly and downwardly to conform substantially to the curvature of the sheet meniscus 20 as clearly apparent in Fig. 2.

In the case of natural convection or circulation, there is a practically stagnant layer or film of air or gas in contact with any flat surface along which convection currents are set up. This air layer or film has no motion at the solid surface, but its velocity increases as the distance from the surface increases. In the film proper, however, the rate of air flow is below the "critical velocity" and convection currents scarcely exist. The thickness of a stagnant air layer of this kind depends upon the temperature of the surface. For example, it is estimated at ¾ inch on surfaces at about 400° F. but on hotter glass surfaces it would doubtless be thinner. The shields proper are therefore adapted to be placed sufficiently close to the surfaces of the glass sheet so that the baffles or ribs 18 will be within the limit of the stagnant air layer or film in contact therewith, whereby they will prevent or break up the formation of convection currents adjacent the surfaces of the sheet. When the shields are set close enough to the sheet surfaces, the convection currents will be effectively eliminated. Furthermore, the shields, due to their close proximity to the glass sheet, will protect the same from drafts, puffs or gases issuing from the furnace and from dirt, dust and other foreign matter. The shields proper are preferably constructed of a heat resisting alloy such as nichrome, or some other similar metal.

The present invention also embodies the provision of means adapted to be associated with the shields proper in a manner to prevent air currents from coming in contact with the backs thereof. This is an important feature in that should such currents be permitted to act on the backs of the shields they are very apt to produce cold streaks in the metal and thus indirectly produce in the glass sheet those waves which it is desired to eliminate. Otherwise stated, the object is not only to avoid the direct contact of convection air currents with the glass surfaces during the drawing operation but also any possible indirect effect by uneven or streaky cooling of the rear surfaces of the shields.

This is accomplished preferably by the use of water coolers and insulation which protect the shields from any effects of variable air currents or unequal temperature of the surroundings so that constant temperatures are assured across the full width of the sheet. Naturally, this tends to make cooling and contraction of the sheet more even which is also an important advantage. Thus, the plate 17 of shield 15 is provided at its upper end with a rearwardly extending horizontal flange 22 and adjacent its lower end with a similar rearwardly extending flange 23, which flanges are connected at their opposite ends by substantially vertical flanges 24. The several flanges 22, 23 and 24 form, in effect, a continuous flange upon the back of plate 17 creating a recess within which is arranged a cooler 25 secured in place by strips or the like 26. The cooler 25 preferably consists of a metallic casing through which is adapted to be circulated a suitable cooling medium such as water or some other liquid, this cooling medium being introduced into the casing through a pipe 27 adjacent the lower end thereof and permitted to exit therefrom through a pipe 28 adjacent its upper end. The cooler 25 is disposed in a vertical position and the inner surface thereof is substantially parallel with but spaced from the back of plate 17, this spaced relation being maintained by spacing bosses 29. The extreme lower end of the plate 17 is curved rearwardly as at 30 and disposed between this curved portion and the flange 23 is a suitable layer of insulating material 31 which forms a backing for the lower portion of the shield proper and which is held in place by a plate or the like 32. With such an arrangement, it will be readily apparent that air currents are prevented from striking directly against the back of the plate 17 so that the disadvantages incident to uneven or streaky cooling thereof are eliminated. By protecting the back of the shield proper in this manner, the temperature of the sheet can be maintained more nearly constant and uniform throughout its width.

The shield 16 is of substantially the same construction as shield 15, with the single exception that since it is of considerably greater height, two superposed coolers 33 and 34 are provided instead of a single cooler. The coolers 33 and 34 are, however, similar to the cooler 25 and are mounted in the same manner with respect to the shield proper. The cooling medium for the coolers 33 and 34 is adapted to enter through pipes 35 and 36 adjacent the bottoms thereof and exit through pipes 37 and 38 adjacent the upper ends thereof. The curved lower end portion of the shield 16 is also insulated in the same manner as is shield 15.

As shown in Fig. 10, during the drawing of the sheet in accordance with the process herein disclosed, the knurled rollers 12 form heavy or knurled edges 39 on the sheet and adjacent which edges are thickened strips of glass 40. It is essential that these knurled edges and the thick strips of glass adjacent thereto be heated and thus softened in order to permit proper bending of the sheet from the vertical into the horizontal plane about the bending roll 10. Heretofore, gas burners have been used for this purpose, the exposed flames therefrom being directed against the edge portions of the sheet. The use of exposed flames has not been entirely satisfactory, however, the chief objection thereto being that they tend to dirty the sheet. According to the present invention, electric heaters are provided for softening the knurled edges and the thick strips of glass adjacent thereto. The electric heaters can be easily regulated to permit desired graduation of the heat and further give out a clean heat which will not dirty the sheet. It will be noted upon reference to Fig. 3, that the shields extend only across the main central body portion of the sheet and carried by each side of each shield adjacent the upper end thereof and projecting outwardly therebeyond is an electric heater designated generally by the numeral 41. These electric heaters are positioned opposite the knurled edges of the sheet and the thick strips of glass adjacent thereto. Each electric heater 41 consists of a metallic casing 42 within which is arranged a porcelain or alundum body 43 backed by a layer of suitable insulation 44. The heater wires 45 are preferably arranged in the manner shown in Fig. 3 and the opposite end portions thereof extend rearwardly through the body 43 and casing 42 and are connected with the lead wires 46 and 47. In order to avoid hot streaks in the knurled edges of the sheet, the heater wires 45 are not exactly parallel to the line of motion of the sheet edge but preferably diverge slightly therefrom.

The means for mounting and adjusting the shields 15 and 16 may take a variety of different forms but a preferred design of supporting and adjusting mechanism is herein shown by way of example. Carried by the framework 48 of the drawing machine, at each side of the sheet, is a fixed bracket 49 to the lower end of which is pivoted, as at 50, a bell crank lever 51 having a substantially vertical portion 52 and a substantially horizontal portion 53. Loosely received through the upper end of the substantially vertical portion 52 of bell crank lever 51 is a rod 54 secured at its inner end as at 55 and having a nut 56 threaded upon its outer end. Pivoted to the outer end of the substantially horizontal portion 53 of bell crank lever 51, as at 57, is a member 58 adapted to support upon the upper end thereof the outer ends of supporting arms 59 and 60 which arms are secured at their inner ends to the shields 15 and 16 respectively adjacent the upper ends thereof. The member 58 is provided at its upper end with upstanding ears 61 through which are horizontally threaded adjusting screws 62 and 63 bearing at their inner ends against arms 59 and 60. Compression springs 64 and 65 arranged inwardly of the arms 59 and 60 engage the same to normally urge said arms outwardly into engagement with the adjusting screws 62 and 63. The inner ends of the compression springs bear against a fixed part 66. The member 58 is provided at its lower end with a laterally extending portion 67 adapted to support thereupon the supporting arms 68 and 69 secured to the shields 15 and 16 respectively adjacent the lower ends thereof. These latter arms are maintained in position by means of the adjusting screws 70 and 71 and compression springs 72 and 73. The horizontal portion 53 of bell crank lever 51 is provided with a depending lug 74 adapted to be engaged by an adjusting element 75 passed transversely through the member 58.

By the provision of the supporting and adjusting means above described, the shields are capable of a plurality of adjustments. Thus, by rotating the nuts 56 at the opposite sides of the machine, the bell crank levers 51 can be rocked about their pivots 50 to raise or lower the members 58 and consequently the shields 15 and 16. The opposite ends of the shields are independently adjustable but the corresponding ends of the two shields are movable as a unit. Upon rotation of the adjusting elements 75, which bears against the depending lugs 74, the members 58 can be rocked about their pivot points 57 to vary the angle of the shields with respect to the sheet. Likewise, by properly adjusting the set screws 62, 63, 70 and 71, the shields may be moved independently of one another inwardly or outwardly relative to the sheet 8.

The particular construction and arrangement of the means described hereinabove for mounting and adjusting the shields forms the subject-matter of a divisional application filed April 14, 1930, Serial No. 444,000.

The shield 15 terminates somewhat beneath the bending roll 10 and preferably carries upon its upper end a bending roll cooler 76.

The shields proper above described may be and are preferably, though not necessarily, constructed in the manner illustrated in Figs. 6, 7 and 8. By referring to these figures, it will be seen that the plate 17b, corresponding to the plate 17 above described, is not flat but, on the other hand, is concaved transversely and that the ribs 18b are correspondingly concaved. The amount or degree of concavity of the plate and ribs is greatest at the top of the shield and gradually decreases toward bottom thereof. Such a construction is provided to counteract the tendency of the shield to expand when it becomes hot. The metal surface adjacent to the glass will expand more than the surface adjacent to the coolers and in the event the shield were made flat when cold, it would become curved when hot and the edges would be too far away from the glass. Consequently, the plate 17b and ribs 18b are given a proper concavity when cold so that they will become plane surfaces when the shields are in place and heated.

In Figs. 9 the shields illustrated are of a slightly modified construction. The shields herein shown are designated in their entirety 15a and 16a and are the same, in all material respects, as the shields 15 and 16 with the exception that the surfaces of the plates 17a adjacent the sheet are plane instead of being provided with ribs.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim

1. In sheet glass apparatus, the combination with means for forming a sheet from a mass of molten glass, of metallic means arranged at one side of and in close proximity to the sheet for preventing convection currents in the air and gases surrounding said sheet from contacting therewith, and means for protecting said first named means from variable air currents.

2. In sheet glass apparatus, the combination with means for forming a sheet from a mass of molten glass, of a metallic plate shield arranged at one side of the sheet and in close proximity thereto for preventing the setting up of convection currents adjacent the surface thereof, the lower portion of said shield being curved to conform substantially to the curvature of the sheet meniscus.

3. In sheet glass apparatus, the combination with means for forming a sheet from a mass of molten glass, of an imperforate metallic shield arranged at one side of the sheet and in relatively close proximity thereto, and means for protecting the back of the shield from variable air currents.

4. In sheet glass apparatus, the combination with means for forming a sheet from a mass of molten glass, of an imperforate metallic shield arranged at one side of the sheet and in relatively close proximity thereto, and cooling means associated with the back of said shield.

5. In sheet glass apparatus, the combination with means for forming a sheet from a mass of molten glass, of a shield arranged at one side of the sheet, and cooling and insulating means associated with the back of said shield for protecting the same from variable air currents.

6. In sheet glass apparatus, the combination with means for forming a sheet from a mass of molten glass, of a shield positioned at one side of the sheet and in relatively close proximity thereto, means for cooling the back of the upper portion of the shield, and means for insulating the back of the lower portion of said shield.

7. In sheet glass apparatus, the combination with means for forming a sheet from a mass of molten glass, of a shield positioned at one side of the sheet and in relatively close proximity thereto, the lower portion of the shield being curved to conform substantially to the curvature of the sheet meniscus, a cooler arranged in back of the upper portion of the shield and maintained substantially parallel with but in spaced relation thereto, and a backing of insulation for the lower curved portion of said shield.

8. In sheet glass apparatus, the combination with means for forming a sheet from a mass of molten glass, of a shield arranged at one side of the sheet and provided with a plurality of ribs upon the side thereof facing said sheet, the upper portion of the shield being substantially straight while the lower portion thereof is curved to fit substantially in the curvature of the sheet meniscus.

9. In sheet glass apparatus, the combination with means for forming a sheet from a mass of molten glass, of a shield arranged at one side of the sheet for protecting the same, and means carried by said shield for heating the border portions of said sheet.

10. In sheet glass apparatus, the combination with means for forming a sheet from a mass of molten glass, of a shield arranged at one side of the sheet for protecting the same, and electric heating means carried by said shield and adapted to heat the border portions of said sheet.

11. In a sheet glass apparatus, the combination with means for forming a sheet from a mass of molten glass, of a shield arranged at one side of the sheet and arranged opposite the main central body portion thereof for protecting the same, and an electric heater carried at either side of the shield and projecting therebeyond for heating the border portions of said sheet.

12. In sheet glass apparatus, the combination with means for forming a sheet from a mass of molten glass, of a shield arranged at one side of the sheet and in relatively close proximity thereto for protecting the same, the surface of the shield adjacent the sheet being concave when cold and the degree of concavity of said surface being greatest at the top of the shield and gradually becoming less toward the bottom thereof.

13. In sheet glass apparatus, the combination with means for forming a sheet from a mass of molten glass, of a shield arranged at one side of the sheet and in relatively close proximity thereto for protecting the same, said shield being provided with a plurality of spaced horizontal ribs upon the surface thereof adjacent the sheet, the surface of the shield adjacent the sheet being concave when cold and the ribs thereon being correspondingly concaved, the degree of concavity of said surface and ribs being greatest at the top of the shield and gradually becoming less toward the bottom thereof.

14. In sheet glass apparatus, the combination with means for forming a sheet from a mass of molten glass, of a shield arranged at one side of the sheet for protecting the same, and means carried by said shield and disposed opposite the border portions of the sheet for controlling the temperature thereof.

15. In sheet glass apparatus, the combination with means for forming a sheet from a mass of molten glass, of a shield arranged at one side of the sheet and disposed opposite the main central body portion thereof for protecting the same, and means carried at either side of the shield and projecting therebeyond for controlling the temperature of the border portions of said sheet.

16. In sheet glass apparatus, the combination with means for forming a sheet from a mass of molten glass, of a shield arranged at one side of the sheet for protecting the same, a hollow body carried at the back of said shield, and means for internally cooling said body.

17. In sheet glass apparatus, the combination with means for forming a sheet from a mass of molten glass, of a shield positioned at one side of the sheet in relatively close proximity thereto and provided with a recess in the back thereof, a hollow body positioned within said recess, and means for circulating a cooling medium through said body.

18. In sheet glass apparatus, the combination with means for forming a sheet from a mass of molten glass, of a shield arranged at one side of the sheet for protecting the same, and means for insulating the back of said shield.

19. In sheet glass apparatus, the combination with means for forming a sheet from a mass of molten glass, of a shield positioned at one side of the sheet and in relatively close proximity thereto for protecting the same, and insulating means carried by said shield and arranged at the back thereof.

20. In sheet glass apparatus, the combination with means for forming a sheet from a mass of molten glass, of a shield arranged at one side of the sheet and in relatively close proximity thereto for protecting the same, the surface of the shield adjacent the sheet being concave when cold.

Signed at Pittsburgh, in the county of Allegheny and State of Pennsylvania, this 23rd day of November, 1928.

WILLIBALD TRINKS.
JOHN D. KELLER.